US010131108B2

United States Patent

(12) United States Patent
Kendrick et al.

(10) Patent No.: US 10,131,108 B2
(45) Date of Patent: Nov. 20, 2018

(54) SYSTEM AND METHOD OF MANUFACTURING COMPOSITE CORE

(71) Applicant: Bell Helicopter Textron Inc., Fort Worth, TX (US)

(72) Inventors: Phillip A. Kendrick, Fort Worth, TX (US); Paul K. Oldroyd, Azle, TX (US); Levi H. Armstrong, Saginaw, TX (US); Elizabeth Oberle, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 224 days.

(21) Appl. No.: 13/782,359

(22) Filed: Mar. 1, 2013

(65) Prior Publication Data

US 2014/0246149 A1    Sep. 4, 2014

(51) Int. Cl.

| | |
|---|---|
| ***B31C 3/00*** | (2006.01) |
| ***B31D 3/02*** | (2006.01) |
| ***B29C 53/82*** | (2006.01) |
| ***B29D 99/00*** | (2010.01) |
| ***B29C 53/58*** | (2006.01) |
| ***B29C 35/04*** | (2006.01) |

(Continued)

(52) U.S. Cl.

CPC .............. *B32B 1/08* (2013.01); *B29C 53/824* (2013.01); *B29D 99/0089* (2013.01); *B31C 3/00* (2013.01); *B31D 3/0223* (2013.01); *B29C 35/045* (2013.01); *B29C 53/582* (2013.01); *B29C 2035/043* (2013.01); *B29C 2035/046* (2013.01); *B29L 2031/608* (2013.01)

(58) Field of Classification Search

CPC ..... B29C 53/60; B29C 53/821; B29C 53/822; B29C 70/222; B29D 99/0089

USPC .... 156/288, 89.22, 189, 215, 218, 228, 289, 156/290, 286, 306.6, 306.9, 307.1, 307, 156/307.7; 428/116, 118, 137; 264/630

See application file for complete search history.

(56) References Cited

U.S. PATENT DOCUMENTS

| | | | |
|---|---|---|---|
| 2,731,067 | A | 1/1956 | Miller |
| 2,995,011 | A | 8/1961 | Kimmel |
| 3,230,123 | A | 1/1966 | Christensen |

(Continued)

FOREIGN PATENT DOCUMENTS

| | | |
|---|---|---|
| CN | 1911632 | 2/2007 |
| CN | 101180176 | 5/2008 |

(Continued)

OTHER PUBLICATIONS

European Search Report in related European Application No. 13171126.9-1703, dated Nov. 26, 2013, 3 pages.

(Continued)

*Primary Examiner* — Sing P Chan

(74) *Attorney, Agent, or Firm* — Timmer Law Group, PLLC

(57) ABSTRACT

A method of manufacturing a composite core can include: wrapping a mandrel in a mandrel wrapping process by securing a mandrel with a winding jig; orienting the composite material at a wrap angle to the mandrel; and depositing the composite material around a circumference of the mandrel. The method can further include assembling the wrapped mandrels in a tool and applying a pressure to the composite material during a curing cycle.

16 Claims, 12 Drawing Sheets

1201 1205 1203a 1213 1203f 1203b 1205 1205 1207 1203e 1203c 1205 1205 1205 1203d

(51) Int. Cl.

| | |
|---|---|
| ***B32B 1/08*** | (2006.01) |
| *B29L 31/60* | (2006.01) |

(56) References Cited

U.S. PATENT DOCUMENTS

| | | | | |
|---|---|---|---|---|
| 3,671,348 | A | 6/1972 | Kemsey-Bourne | |
| 3,778,322 | A | 12/1973 | Keith et al. | |
| 4,310,374 | A * | 1/1982 | MacMillan | B29D 30/56 156/381 |
| 5,128,192 | A * | 7/1992 | Narasaki | 428/118 |
| 5,549,773 | A | 8/1996 | Henderson et al. | |
| 5,567,500 | A * | 10/1996 | Marshall et al. | 428/116 |
| 5,730,920 | A | 3/1998 | Marshall et al. | |
| 5,789,060 | A | 8/1998 | Marshall et al. | |
| 5,980,674 | A * | 11/1999 | Burger | B29C 53/562 156/189 |
| 5,981,025 | A | 11/1999 | Marshall et al. | |
| 6,503,596 | B1 | 1/2003 | Fellman | |
| 7,345,616 | B2 | 3/2008 | Williams | |
| 7,431,074 | B1 | 10/2008 | Fellman et al. | |
| 2002/0106483 | A1* | 8/2002 | Obeshaw | B21C 37/15 428/116 |
| 2002/0129897 | A1 | 9/2002 | Gonzalez | |
| 2008/0087371 | A1 | 4/2008 | Friedrich | |
| 2010/0051182 | A1 | 3/2010 | Graham | |
| 2011/0132524 | A1 | 6/2011 | Friedrich | |
| 2011/0151183 | A1 | 6/2011 | Reller et al. | |
| 2011/0214773 | A1 | 9/2011 | Hamachi et al. | |
| 2012/0021165 | A1 | 1/2012 | Hethcock et al. | |
| 2012/0284970 | A1 | 11/2012 | May et al. | |
| 2012/0321835 | A1 | 12/2012 | Hethcock, Jr. et al. | |
| 2014/0308433 | A1* | 10/2014 | Ouellette | B29C 70/32 427/8 |

FOREIGN PATENT DOCUMENTS

| | | | |
|---|---|---|---|
| CN | 101180176 | A | 5/2008 |
| CN | 102143834 | | 8/2011 |
| CN | 102741045 | | 10/2012 |
| CN | 102741045 | A | 10/2012 |
| DE | 3039764 | | 5/1982 |
| DE | 4006354 | | 9/1991 |
| EP | 2146126 | | 1/2010 |
| EP | 2146126 | A1 | 1/2010 |
| WO | 0117759 | | 3/2001 |
| WO | 2006099671 | A1 | 9/2006 |
| WO | WO2006099671 | A1 * | 9/2006 |
| WO | 2011097433 | A1 | 8/2011 |

OTHER PUBLICATIONS

European Communication in related European Application No. 13171126.9-1703, dated Dec. 13, 2013, 4 pages.

European Search Report in related European Application No. 13171125.1-1703, dated Nov. 19, 2013, 3 pages.

European Communication in related European Application No. 13171125.1-1703, dated Dec. 5, 2013, 4 pages.

European Search Report in related European Application No. 13171128.1-1703, dated Nov. 26, 2013, 3 pages.

European Communication in related European Application No. 13171128.1-1703, dated Nov. 26, 2013, 4 pages.

Office Action in related U.S. Appl. No. 13/782,180, dated Aug. 29, 2014, 15 pages.

Office Action in related U.S. Appl. No. 13/782,283, dated Aug. 29, 2014, 17 pages.

71(3) in related European Patent Application No. 13171128.5, dated May 4, 2015.

Office Action in related Chinese Patent Application No. 201410074967.4, dated Aug. 4, 2015.

Office Action in related Chinese Patent Application No. 201410074956.6, dated Aug. 6, 2015.

71(3) in related European Patent Application No. 13171125.1, dated Oct. 2, 2015.

Notice of Allowance in related U.S. Appl. No. 13/782,283, dated Oct. 30, 2015.

European Search Report for related European Patent Application No. 15180271.7, dated Nov. 11, 2015.

Examination Report in related European Patent Application No. 15180271.7, dated Nov. 24, 2015.

Office Action in related Canadian Patent Application No. 2844020, dated Dec. 2, 2015.

Office Action in related Chinese Patent Application No. 201410074956.6, dated Dec. 15, 2015.

Office Action in related Chinese Patent Application No. 201410074958.5, dated Dec. 29, 2015.

Office Action in related Canadian Patent Application No. 2844136, dated Jan. 13, 2016.

Office Action in related Chinese Patent Application No. 201410074967.4, dated Jan. 19, 2016.

Notice of Allowance in related Chinese Patent Application No. 201410074967.4, dated May 4, 2016.

Examination Report in related European Patent Application No. 15180271.7, dated Jun. 6, 2016.

Office Action in related U.S. Appl. No. 13/782,180, dated Feb. 24, 2015, 16 pages.

Notice of Allowance in related U.S. Appl. No. 13/782,180, dated Jun. 8, 2015, 10 pages.

Advisory Action in related U.S. Appl. No. 13/782,180, dated Apr. 30, 2015, 2 pages.

Office Action in related U.S. Appl. No. 13/782,283, dated Mar. 6, 2015, 19 pages.

Office Action in related U.S. Appl. No. 13/782,283, dated Jun. 18, 2015, 16 pages.

Office Action, dated Sep. 21, 2016, by the CIPO, regarding CA Patent App No. 2844136.

Second Office Action, dated Sep. 7, 2016, by the SIPO, regarding CN Patent App No. 201410074958.5.

Office Action in related European Patent Application No. 13,171,125 dated Jul. 4, 2015.

Office Action in related Canadian Patent Application No. 2,844,020 Apr. 7, 2015.

Office Action in related Canadian Patent Application No. 2,844,136 dated Apr. 21, 2015.

71(3) in European Patent Application No. 13,171,126 dated May 20, 2015.

* cited by examiner

SYSTEM AND METHOD OF MANUFACTURING COMPOSITE CORE

BACKGROUND

Technical Field

The present disclosure relates to a system and method of manufacturing composite core.

Description of Related Art

A composite structure, such as a composite honeycomb core, can conventionally be manufactured using a manual process of creating a corrugated pattern in a plurality of composite layers by pressing mandrels against the composite layers. For example, the method described in U.S. Pat. No. 5,567,500, utilizes such a process. The geometry of adjacent composite layers to collectively form the cells of the honeycomb core. Such a process is labor intensive which can make the honeycomb core product very expensive. Further, this manufacturing method can result honeycomb core that is not optimal for various structural implementations.

Hence, there is a need for an improved system and method for manufacturing composite core.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
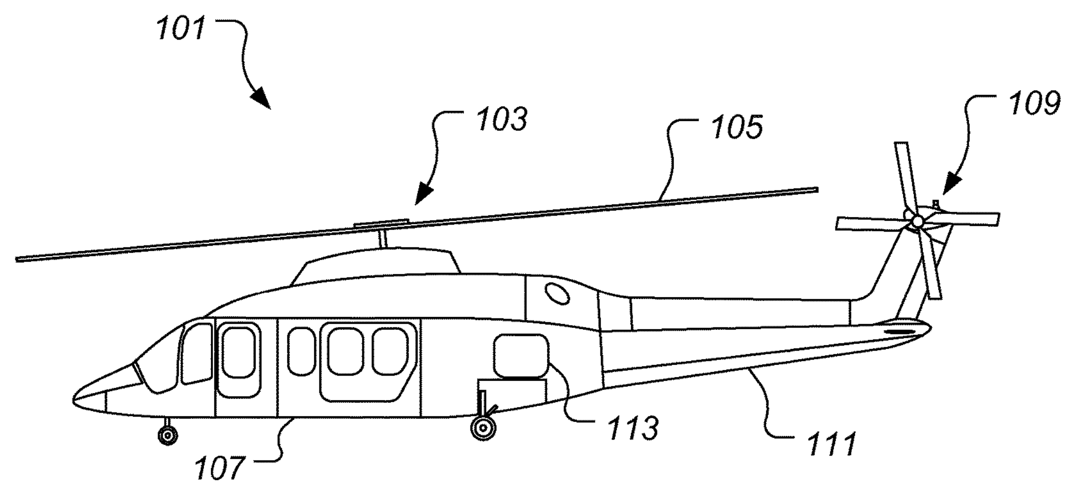
FIG. 1 is a side view of an rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111.

Rotorcraft 101 is merely illustrative of the wide variety of aircraft, vehicles, and other objects that are particularly well suited to take advantage of the method and system of the present disclosure. It should be appreciated that other aircraft can also utilize the method and system of the present disclosure. Further, other vehicles and objects can utilize composite core manufactured by the system and method of the present disclosure. Illustrative embodiments can include wind turbine blades, sea based vehicles, radomes, enclosures, shelters, bridge decks, building facades, ground vehicles, rail vehicles, air vehicles, space vehicles, and manned or un-manned vehicles, to name a few.

Figure 2:
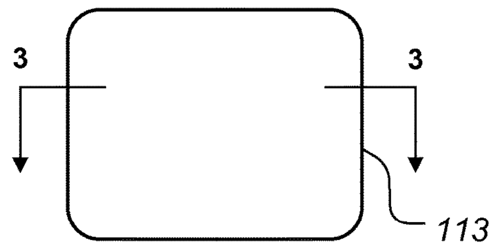
FIG. 2 is a side view of a panel, according to one example embodiment.
Figure 3:
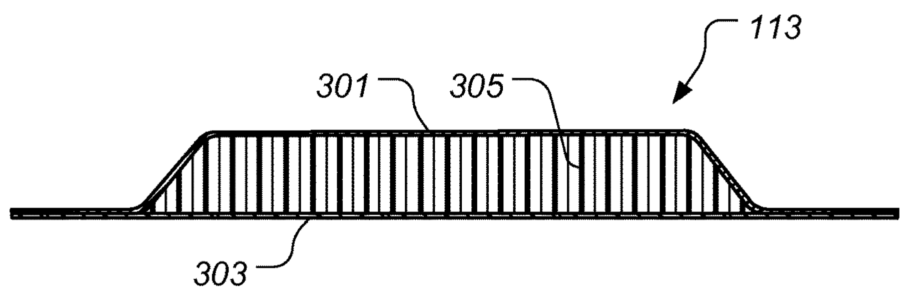
FIG. 3 is a cross-sectional view of the panel, taken from section lines 3-3 in FIG. 2, according to one example embodiment.

Referring now also to FIGS. 2 and 3, a panel 113 on rotorcraft 101 is illustrative of a wide variety of structures that can include a core member configured as a lightweight means of generating strength and stiffness in the structure. Panel 113 is a composite assembly that can include an upper skin 301, a lower skin 303, and a composite core 305. Composite core 305 can be adhesively bonded to upper skin 301 and lower skin 303. It should be appreciated that panel 113 can take on a wide variety of contours and configurations.

Figure 4:
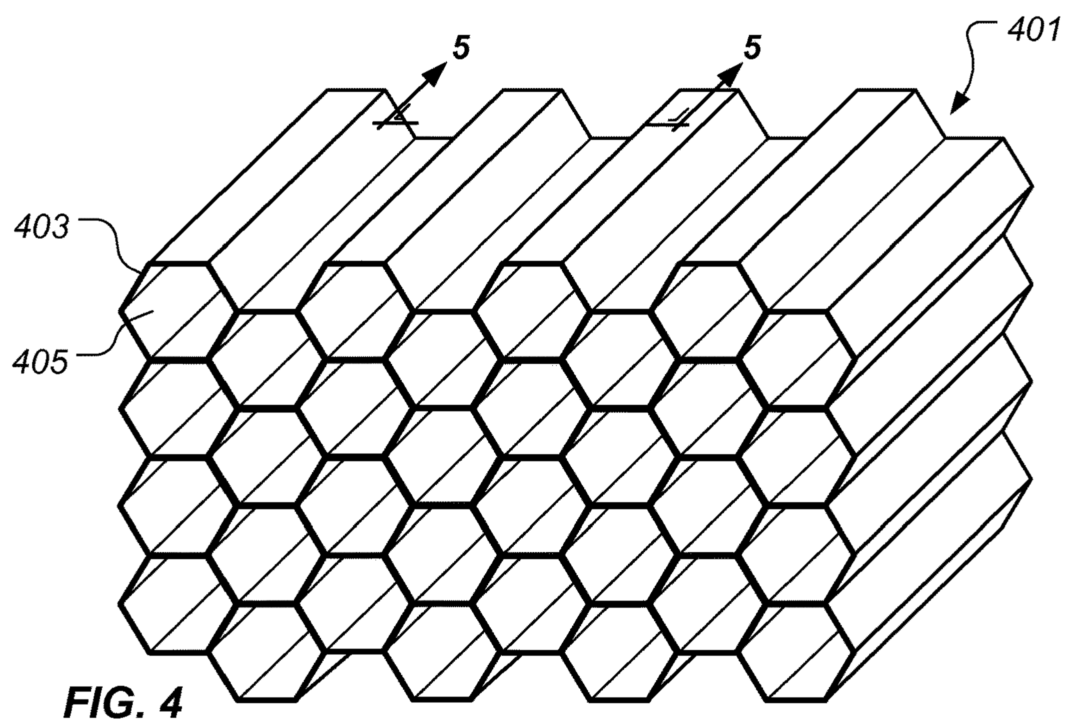
FIG. 4 is a perspective view of a composite core, according to one example embodiment.
Figure 5:
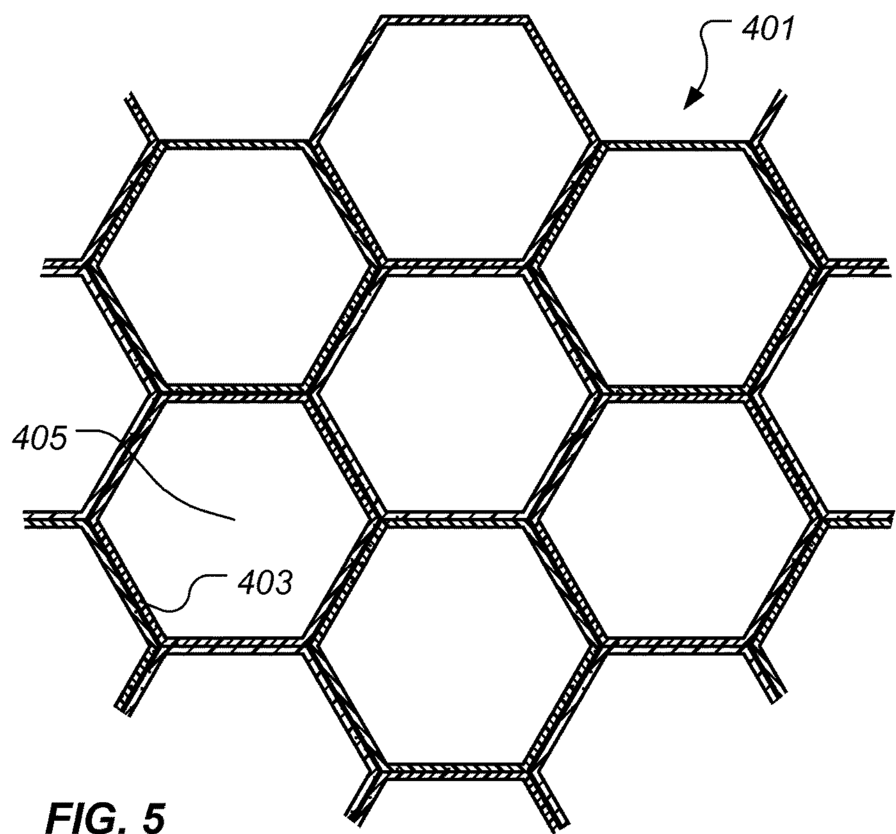
FIG. 5 is a cross-sectional view of the composite core, taken from section lines 5-5 in FIG. 4, according to one example embodiment.

Referring now also to FIGS. 4 and 5, composite core 401 is illustrated in a raw stock configuration. Composite core 305 (shown in FIG. 3), having implementation specific geometry, can be carved from composite core 401, for example. In another embodiment, composite core 401 is manufactured in a net shape such that a subsequent carving procedure is not required. Composite core 401 can be of a wide variety of materials and cell sizes. For example, in one embodiment composite core 401 is made from a carbon fiber and resin composite system. Composite core 401 includes a plurality of tubes 403 (only one tube labeled for clarity) arranged in a two-dimensional array. However, in one embodiment the tubes 403 can be selectively positioned such that the end portions are not in the same plane. Each tube 403 defines a passageway or "cell" 405 extending therethrough. Composite core 401 can comprise any suitable number, size, cross-sectional shape, and construction of tubes 403.

Each tube 403 of composite core 401 can include a plurality of reinforcement fibers disposed in a polymeric matrix. For example, tubes 403 may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E. I. du Pont de Nemours and Company of Richmond, Va.), or the like. The scope of the present disclosure, however, encompasses fibers comprising any suitable material or combination of materials. The polymeric matrix may comprise any suitable resin system, such as a thermoplastic or thermosetting resin for example. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like.

The fibers of tubes 403 may be oriented in one or more directions and may be woven or unwoven. It should be appreciated that tube 403 may alternatively only include fibers arranged in a single direction, such as a uniaxial or helical fiber configurations. In yet another embodiment, a first ply comprises fibers and a second ply comprises fibers, such that the second ply is laid-up over the first ply.

Figure 6:
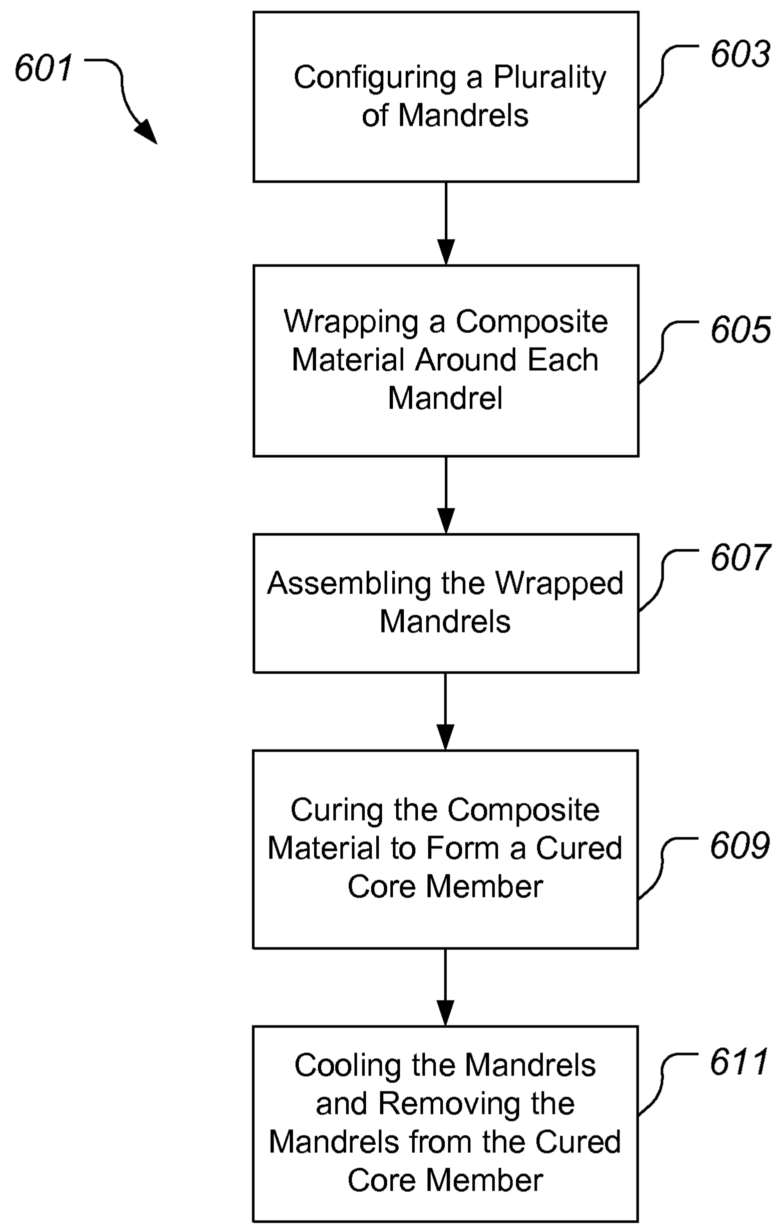
FIG. 6 is a schematic view of a method of manufacturing a composite core, according to one example embodiment.

Referring now also to FIG. 6, a method 601 of manufacturing a composite core, such as composite core 401, is schematically illustrated. Method 601 can include a step 603 of configuring a plurality of mandrels. A step 605 can include wrapping a composite material around each mandrel. A step 607 can include assembling the wrapped mandrels. A step 609 can include curing the composite material to form a cured core member. A step 611 can include cooling the mandrels and removing the mandrels from the cured core member. Each step of method 601 is described in further detail herein.

Figure 21:
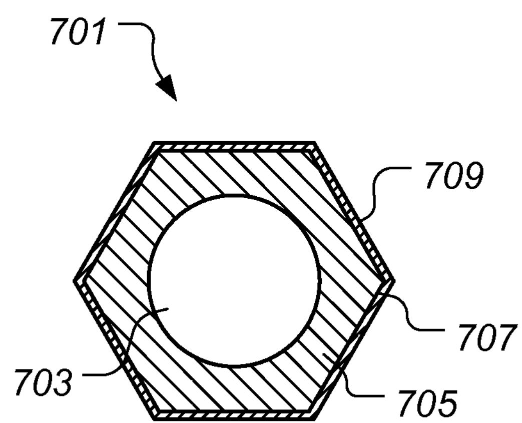
FIG. 21 is a cross-section view of a mandrel taken from FIG. 8, according to one example embodiment.

Referring to FIG. 21, a cross-sectional view through a mandrel 701 is illustrated. Step 603 includes configuring a plurality of mandrels. In the illustrated embodiment, mandrel 701 is a metallic mandrel, such an aluminum material. Mandrel 701 is configured having a material with a relatively low coefficient of thermal expansion (CTE). In the illustrated embodiment, mandrel 701 is preferably cured in a tool that utilizes a bladder or other device to apply pressure from the exterior. However, it should be appreciated that mandrel 701 can also be configured with a material having a desired amount of CTE so that curing pressure is derived from a thermal expansion of the mandrels within a confining tool.

Mandrel 701 may be configured with a hollow portion 703 extending through the centerline length of mandrel 701, forming a body portion 705 between hollow portion 703 and outer surface 707. Mandrel 701 is configured so that during the curing process of the composite core 401, the temperature of each mandrel 701 is increased such that body portion 705 volumetrically expands uniformly both in an inward direction and an outward direction, until outer surface 707 is bounded by its nearest neighbor mandrel, at which point the pressure exerted by mandrel 701 on its nearest neighbor mandrel remains relatively constant, and the thermal expansion of body portion 705 continues primarily in inward direction. The degree of thermal expansion each mandrel 701 is dependent upon the CTE of the material of each mandrel 701. The geometry of mandrel 701 can be selected to tailor the physical properties of mandrel 701 and the resultant composite core 401. Further, the geometry of mandrel 701 can be selected to tailor the strength/stiffness of the mandrel 701. Further, the wall thickness of body portion 705, as well as the geometry of hollow portion 703, can be selectively controlled to produce a desired thermal expansion profile. For example, a mandrel having a smaller hollow portion 703 would provide a higher external pressure than mandrel 701. In the illustrated embodiment, hollow portion 703 is of a cylindrical shape; however, it should be appreciated that other embodiments may have non-cylindrical shapes.

Each mandrel 701 is configured with a hollow portion 703 which allows hot air to be ducted therethrough during the cure cycle, as discussed further herein. However, it should be appreciated that an alternative embodiment of mandrel 701 does not include a hollow portion 703. It should be appreciated that mandrel 701 is merely illustrative of a wide variety of mandrel configurations contemplated. Even though the exterior shape of the mandrels are illustrated as hexagonal, the present disclosure includes mandrels having other exterior shapes, such as square, rectangular, triangular, to name a few examples. Further, it should be appreciated that the hollow portion within the mandrels can be any variety of shape, or shapes. The exact shape of the hollow portion is implementation specific.

In one example embodiment, a Teflon material, or other bond resistant material or coating, can be used to prevent the composite material from bonding to the exterior surface of mandrel 701 during the cure cycle. As such, each mandrel 701 can include a layer 709 of the bond resistant material adjacent to the outer surface 707 of each mandrel 701.

Referring again to FIG. 6, step 605 includes wrapping composite material around each mandrel, such as mandrel 701. The exact method of wrapping or otherwise depositing the uncured composite material on the exterior surface of each mandrel is implementation specific. In the preferred embodiment, one or more steps of method 601 are performed by an automated system; however, it should be appreciated that any of the steps can be performed manually.

Figure 7:
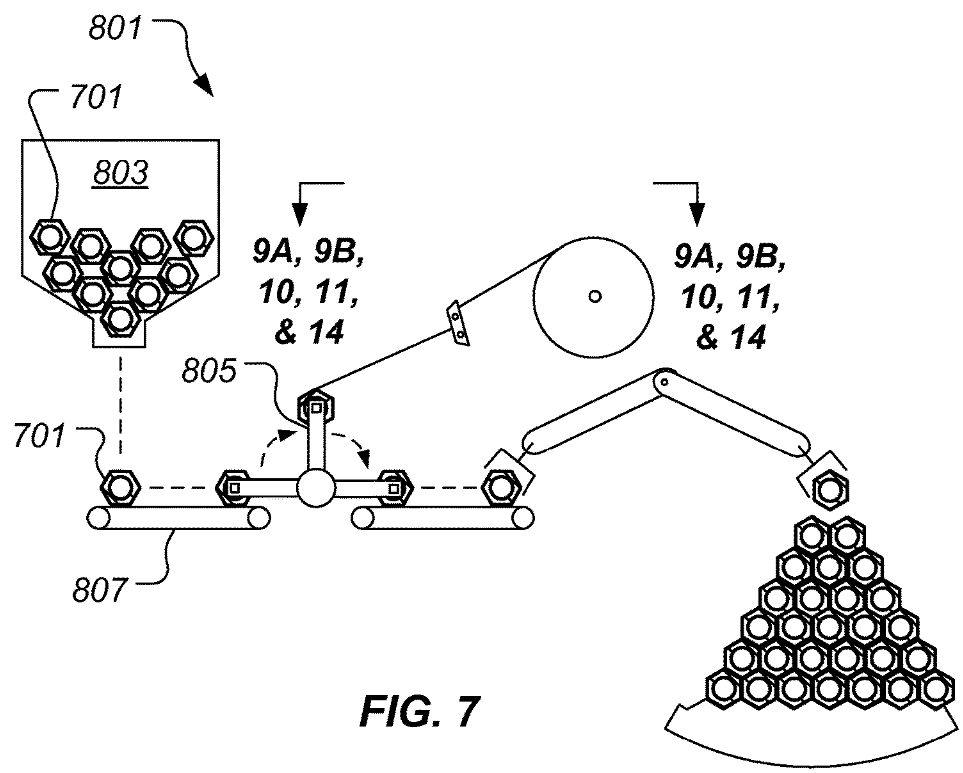
FIG. 7 is a partially stylized view of a system for wrapping and assembling mandrels, according to example embodiment.

Referring also to FIG. 7, a system 801 for at least partially performing one or more steps of method 601 is illustrated. Further, system 801 is particularly well suited for performed steps 605 and 607. Step 605 includes wrapping composite material around each mandrel. Step 607 includes assembling the wrapped mandrels. Each of steps 605 and 607, as well as system 801, are further described herein.

System 801 can include a hopper 803 configured to house a plurality of mandrels 701. Each mandrel 701 can be selectively deployed and captured by a winding jig 805. For example, each mandrel 701 can be released onto a conveyor 807 and picked up by the arms of winding jig 805.

Figure 8:
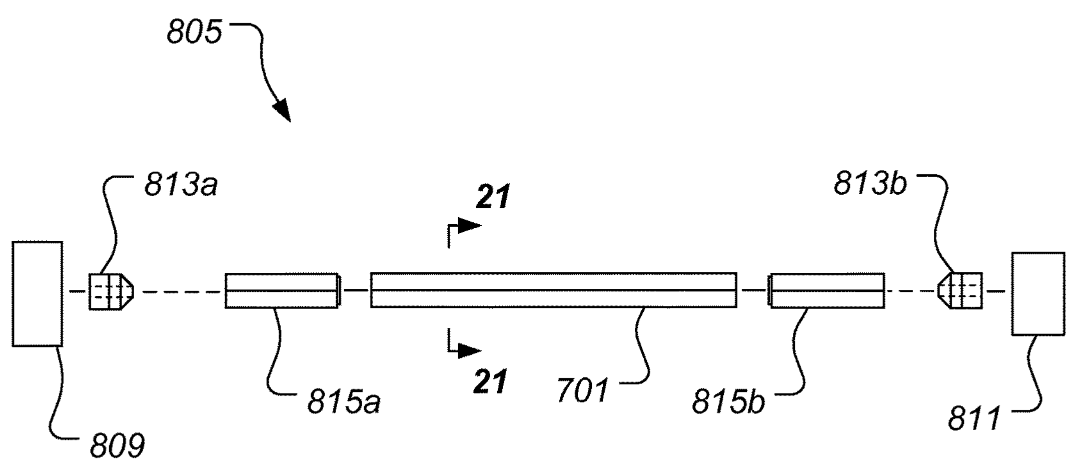
FIG. 8 is an exploded view of a mandrel winding jig, according to example embodiment.

Referring also to FIG. 8, an embodiment of winding jig 805 is illustrated. Winding jig 805 is configured to position and retain mandrel 701 for the depositing of composite material thereon. It should be appreciated that winding jig 805 can take on a variety of implementation specific configurations. In one embodiment, winding jig 805 can include a driver 809 and a support member 811. Adapters 813*a* and 813*b* are operably associated with driver 809 and support member 811, respectively. A coupling 815*a* is positioned between driver 809 and a first end portion of mandrel 701. Similarly, a coupling 815*b* is positioned between support member 811 and a second end portion of mandrel 701.

Winding jig 805 is configured to operably secure mandrel 701 between couplings 815*a* and 815*b*. Couplings 815*a* and 815*b* have similar geometry to that of mandrel 701. Further, winding jig 805 is configured such that the geometry of couplings 815*a* and 815*b* are aligned with mandrel 701 during the composite material winding process. In the illustrated embodiment, driver 809 is configured to drive the rotation of adapters 813*a* and 813*b*, couplings 815*a* and 815*b*, and mandrel, while support member 811 is configured to provide freewheeling support. In an alternative embodiment, mandrel 701 and couplings 815*a* and 815*b* are held stationary while a device operates to place the composite material about the mandrel and couplings 815*a* and 815*b*, as discussed further herein. It should be appreciated that winding jig 805 is merely illustrative of a fixture that can be used to facilitate the depositing of composite material onto mandrel 701 in step 605 of method 601.

Figure 9A:
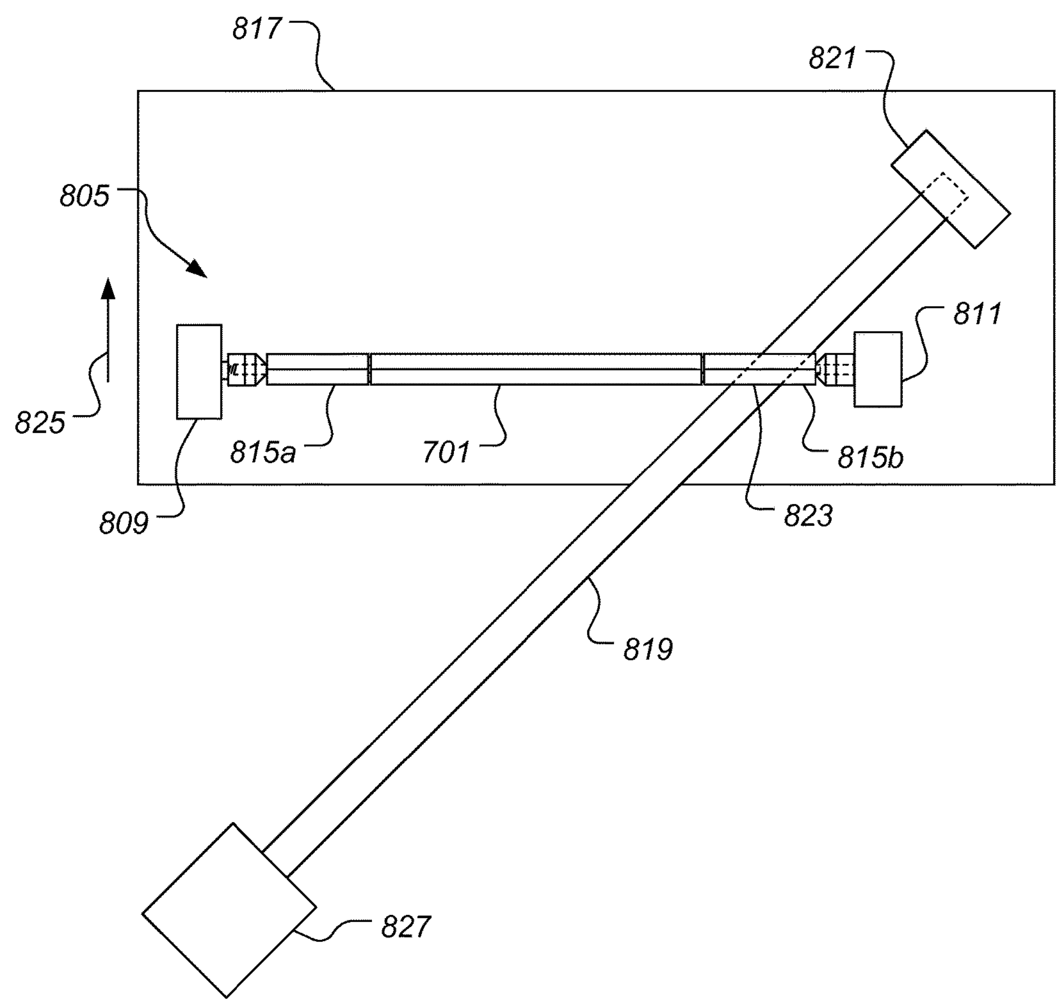
FIG. 9A is a top view of a winding jig, according to example embodiment.

Referring also to FIG. 9A, one non-limiting example embodiment of winding jig 805 for performing at least step 605 of method 601 is illustrated. Winding jig 805 is mounted to a platform 817 that can be translated along a prescribed path. A first end portion of slit 819 can be secured to a mount 821 that is secured to platform 817. Slit 819 is positioned through an opening 823 in coupling 815*b*. A second end portion of slit 819 can remain part of a roll 827 of composite material. In one embodiment, a plurality of cutting members cut roll 827 of composite material into a plurality of slits 819 at prescribed widths, each slit 819 being fed to different winding jigs 805. Platform 817 is biased in direction 825 by a constant tension member such that slit 819 is held in tension. Mount 821 and roll 827 are positioned so that slit 819 is oriented at a desired angle relative to mandrel 701. In the illustrated embodiment, the desired angle of slit 819 is 45 degrees; however, slit 819 can be oriented at any desired angle.

Figure 9B:
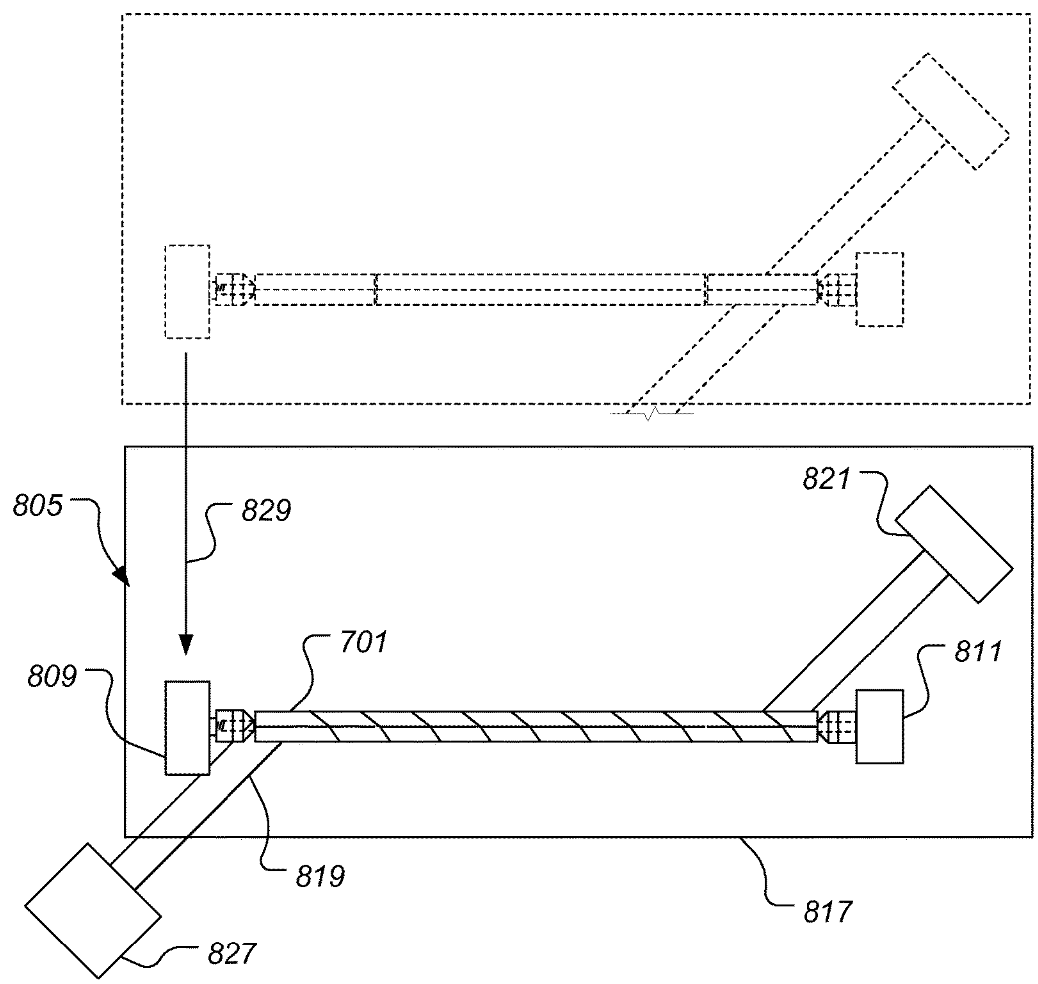
FIG. 9B is a top view of a winding jig, according to example embodiment.

Referring also to FIG. 9B, the operation of winding jig 805 is illustrated. Driver 809 is operated so as to cause mandrel 701 to rotate, which causes slit 819 to wrap around mandrel 701. As slit 819 wraps around mandrel 701, platform 817 is pulled toward roll 827 in direction 829 while the wrap angle is maintained.

Figure 10:
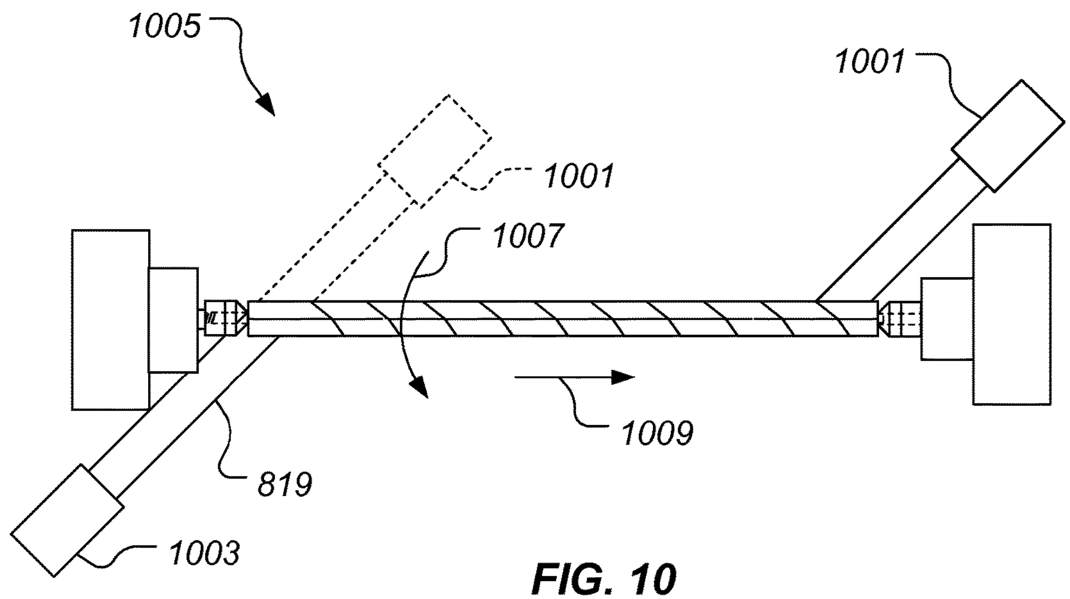
FIG. 10 is a top view of a winding jig, according to example embodiment.

Referring also to FIG. 10, another example embodiment of a winding jig 1005 for wrapping composite material on each mandrel 701 in step 605 is illustrated. Winding jig 1005 is substantially similar to winding jig 805; however, winding jig 1005 is configured so that mandrel 701 is held stationary while a material placement head 1001 moves around mandrel 701, as well as translates along an axis of mandrel 701, such as in directions 1007 and 1009, respectively. Material placement head 1001 is configured to feed composite material while moving in a prescribed path. In such an embodiment, slit 819 can be secured at a stationary mount 1003 so that slit 819 can be placed in tension by material placement head 1001 as slit 819 is wrapped around mandrel 701.

Figure 11:
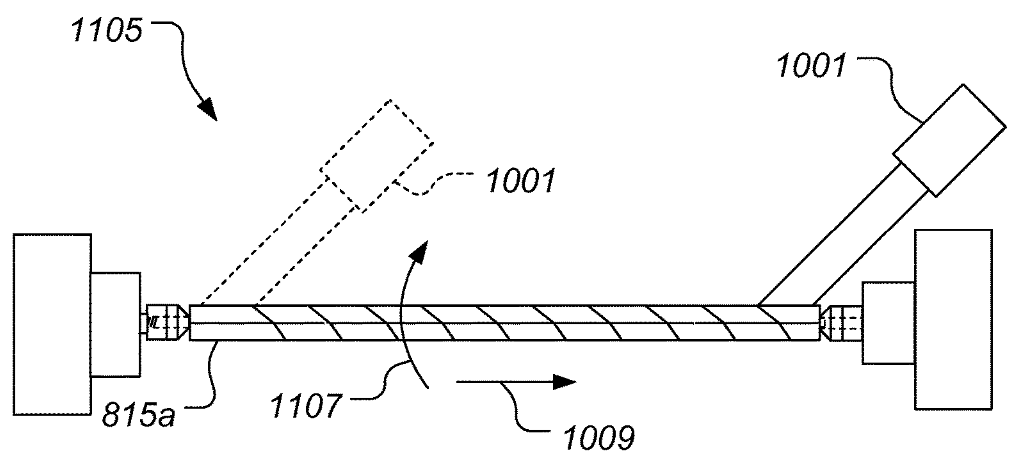
FIG. 11 is a top view of a winding jig, according to example embodiment.

Referring also to FIG. 11, another example embodiment of a winding jig 1105 for wrapping composite material on each mandrel 701 in step 605 is illustrated. Winding jig 1105 is substantially similar to winding jig 1005; however, winding jig 1105 is configured so that mandrel 701 is rotated in a direction 1107 while material placement head 1001 translates along an axis of mandrel 701 corresponding with direction 1009. In such an embodiment, slit 819 can be secured to coupling 815*a*, for example, so that tension can be formed in slit 819 as material placement head 1001 translates and mandrel 701 rotates.

In another example embodiment, the winding jig is configured to translate along a direction corresponding with the axis of mandrel 701 while material placement head 1001 rotates but does not translate.

It should be appreciated that the winding jig can be configured in any combination of the configurations described herein. For example, mandrel 701 can rotate in a first rotational direction while material placement head 1001 rotates around mandrel 701 in an opposite direction to that of the first rotational direction. Further, either mandrel 701 can translate along its axis or the material placement head can translate in a direction corresponding to the mandrel axis, or any combination thereof.

It should be appreciated that the exact system and method for depositing raw composite material on mandrel 701 can be dependent at least upon the material form of the raw composite material.

Figure 12:
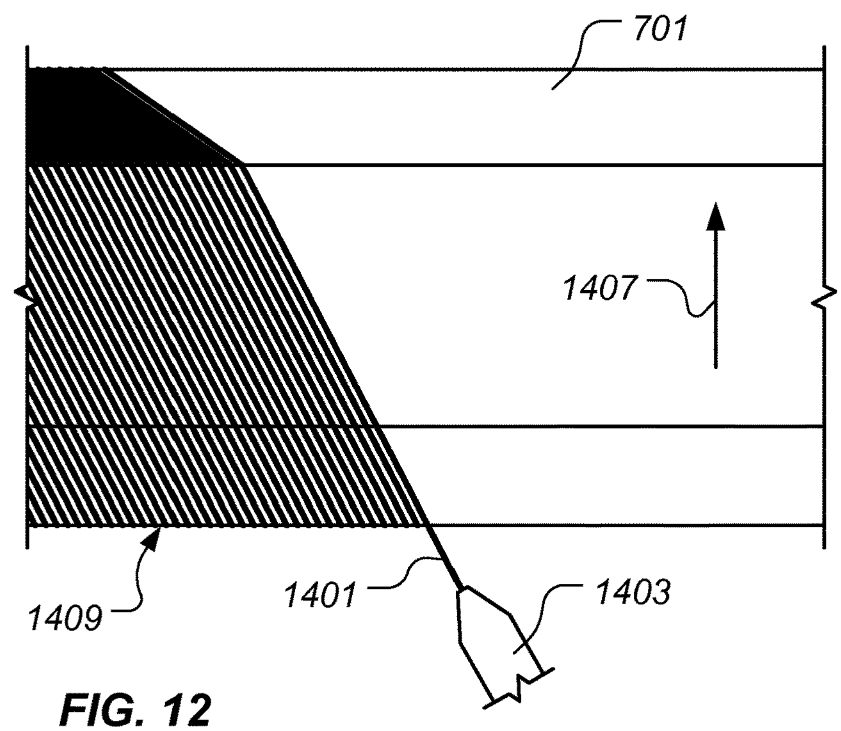
FIG. 12 is a stylized, plan view of a mandrel being wrapped with uncured composite material, according to one particular embodiment.

Referring also to FIG. 12, one technique of wrapping uncured composite material around mandrel 701 utilizes a filament winding process. A continuous, resin-impregnated fiber 1401, extending from a filament winding machine 1403, is wound about mandrel 701. The resin can be either a thermosetting or thermoplastic resin and becomes the polymeric matrix of tube 403 upon curing. The material placement process may be conducted in a variety of processes; for example, mandrel 701 can move axially while a spool of fiber 1401 rotates around the mandrel 701, as indicated by an arrow 1407. Alternatively, a spool or a plurality of spools of material could rotate around mandrel 701. Relative motion of the material dispensing mechanism to mandrel 701 is inferred. As fiber 1401 is wound onto mandrel 701 by filament winding machine 1403, a helical shaped pattern is formed. One or more plies 1409 of fiber 1401, in desired orientations with respect to mandrel 701, are wound onto mandrel 701 to form the basic geometry of tube 403. The angle of which fiber 1401 is wound about mandrel 701 may vary along the length of the mandrel 701 in order to customize the strength of core 401. For example, the angle of the fiber 1401 may be dynamically changed during the material placement process in order to customize a compressive strength of the core. Note that, in the illustrated embodiment, mandrel 701 exhibits a size and shape corresponding to cell 405 (see FIG. 4 or 5). It should be further noted; however, that the present disclosure is not limited to the particular illustrated configurations of filament winding machine 1403 or mandrel 701. Mandrel 701 and the one or more plies 1409 that have been filament wound onto mandrel 701 are subsequently assembled with other mandrels and plies, as will be discussed in greater detail herein, to form core 401 (shown in FIG. 4). It should further be appreciated that upon cutting of plies 1409 and the mandrel 701, the material may have a tendency to un-wind. A band of material, potentially adhesive or fibrous, may be used to keep fiber 1401 from unraveling upon cutting of the plies 1409 and the mandrel 701. An adhesive material with unidirectional fibers could be used to band the fiber 1401 on mandrel 701. Further, the band can be selectively located and used to provide extra support for a subsequent post processing procedure of the core, such as a machining process.

Figure 13:
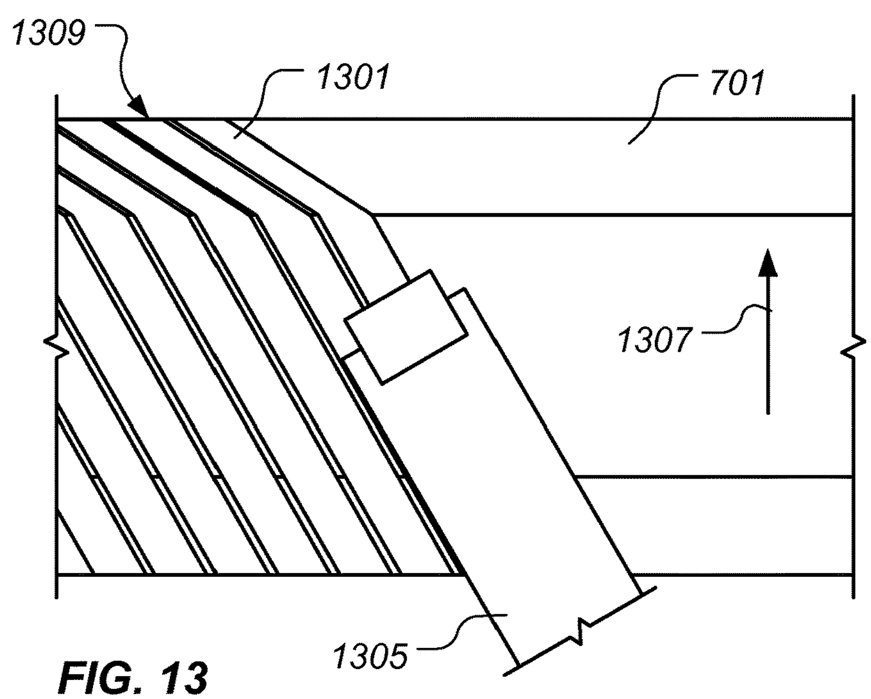
FIG. 13 is a stylized, plan view of a mandrel being wrapped with uncured composite material, according to one particular embodiment.

In yet another example technique of performing step 605 of method 601, shown in FIG. 13, wrapping uncured composite material around mandrel 701 is performed using a fiber placement process. A continuous, resin-impregnated tow 1301 (only one labeled for clarity) of approximately, but not limited to, 1000 fibers is applied to a mandrel 701 by a fiber placement machine 1305. It should be appreciated that tow 1301 may also be portions of a full tow; for example, tow 1301 may be a half tow of 500 fibers. In lieu of a tow 1301, a tape of fibers, cut to a prescribed width, may be used. A pre-cut tape of fibers may be referred to as a "slit-tape." A slit-tape allows the user to more closely control the width dimension, as compared to a tow of fibers. Exemplary prescribed widths of slit-tape include ⅛" and ¼", to name a few. The resin can be a thermosetting or thermoplastic resin, to name two examples, and becomes the polymeric matrix of tube 403 upon curing. During the fiber placement process, mandrel 701 can move axially while tow 1301 rotates around the mandrel 701, as indicated by an arrow 1307. As tow 1301 is applied to mandrel 701 by fiber placement machine 1305, a helical shaped pattern is formed. One or more plies 1309 of tow 1301, in desired orientations with respect to mandrel 701, are wound onto mandrel 701. In one embodiment, one or more non-helical plies layers may be assembled on mandrel 701 to customize mechanical properties in certain directions. It should be appreciated that more than one tow 1301 or slit-tape of different materials may be used. Note that, in the illustrated embodiment, mandrel 701 exhibits a size and shape corresponding to cell 405 (see FIG. 4 or 5). It should be further noted, however, that the present disclosure is not limited to the particular illustrated configurations of fiber placement machine 1305 or mandrel 701. Mandrel 701 and the one or more plies 1309 that have been fiber placed onto mandrel 701 are subsequently assembled with other mandrels and plies, as will be discussed in greater detail below, to form core 401 (shown in FIG. 4).

Figure 14:
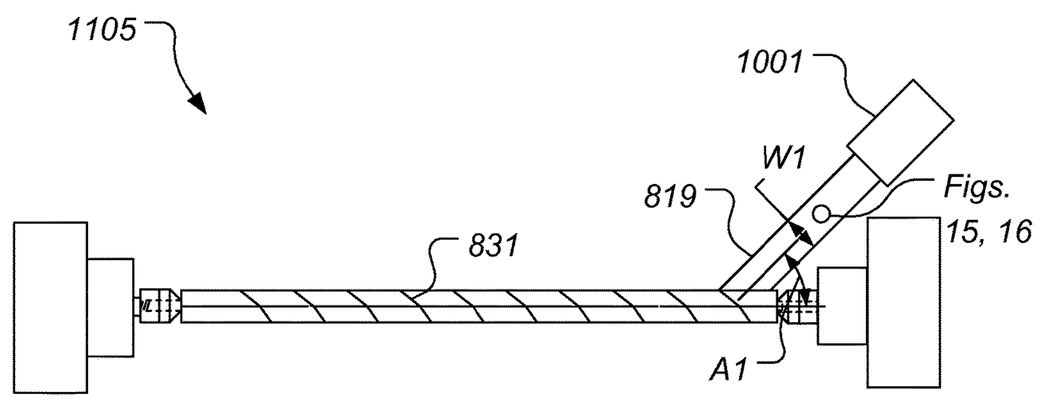
FIG. 14 is a top view of a winding jig, according to example embodiment.
Figure 15:
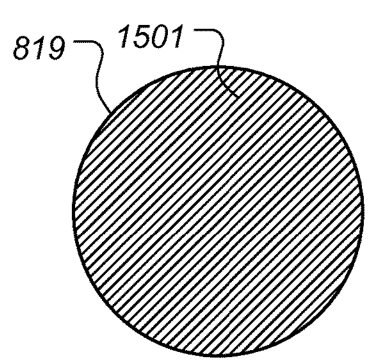
FIG. 15 is a detail view taken from FIG. 14, according to one example embodiment.
Figure 16:
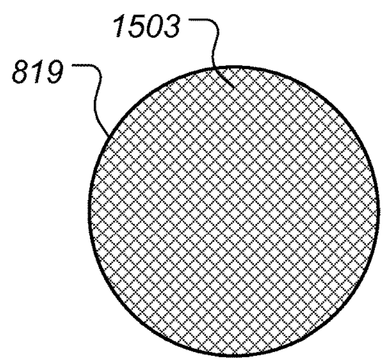
FIG. 16 is a detail view taken from FIG. 14, according to one example embodiment.

Referring now also to FIGS. 14-16, one example embodiment of step 605 includes wrapping mandrel 701 with a broadgood form of slit 819 in such a procedure that results in solid passageway or "closed cell" geometry. Namely, the broadgood form of slit 819 has a width W1 that is selected to prevent a gap or space in the slit 819 after slit 819 is wrapped around mandrel 701. Further, as slit 819 is wrapped around mandrel 701, a continuous seam 831 is formed; however, seam 831 is not a gap or space in the material, rather seam 831 represents an abutment of helically wrapped material, such as slit 819, which is an example of a customized width broadgood composite material. In contrast, the wrapping of a mandrel with composite material that produces a gap or space in the material, or an "open cell" geometry, as described with regard to FIGS. 12 and 13, can have undesirable attributes in certain implementations. For example, the "open cell" embodiment may be limited by the widths of the tows or slits having to be consistent, resulting in having only a fixed whole number of tows for a given spacing and angle, and the gaps having to be a uniform width. The result is only having a fixed whole number of materials for a given spacing and angle. The angle with which the tow or slit is wrapped cannot be varied infinitely and still retain a specific tow or slit width and spacing. Furthermore, an "open cell" geometry core can be undesirable in some panel implementations because of insufficient bond surface at the core/skin interface. Further, for a given mandrel geometry there are a limited number of tow or slit width and gap combinations that will satisfy construction of the core tube for a given wrap angle.

Referring in particular to FIGS. 15 and 16, the orientation fibers 1501 of slit 819 is implementation specific. In the embodiment illustrated in FIG. 15, fibers 1501 are unidirectional such that all the fibers extend in a direction corresponding with the length of the slit 819. In the embodiment illustrated in FIG. 16, fibers 1503 are multidirectional so as to form a fabric configuration.

Figure 17:
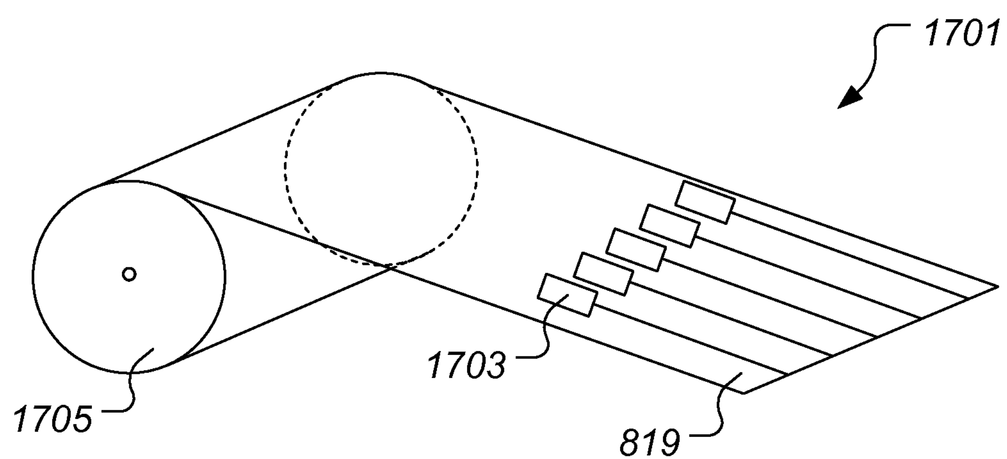
FIG. 17 is a perspective view of a cutting tool, according to one example embodiment.

Still referring to FIGS. 14-16, a nominal width W1 of slit 819 can be calculated by multiplying the circumference of the exterior surface of mandrel 701 by the cosine of the wrap angle A1. One major advantage of using slit 819 to wrap mandrel 701 without material gaps is that the angle A1 can be customized for the core implementation while simply adjusting for the width W1 of slit 819. Furthermore, the slit 819 can be cut off from a much wider roll of bulk raw material, such that the customization of width W1 can be simply a matter of adjusting the cutting tool to provide the implementation specific width. Customizing the angle A1 allows a user to tailor the physical properties of the core by orienting the fibers 1501 in a direction to produce said physical properties. Referring briefly to FIG. 17, an example cutting tool 1701 is illustrated. Cutting tool 1701 can have a plurality of cutting members 1703, such as blades, that can be oriented to cut slits 819 at prescribed widths from a raw material roll 1705. Each slit 819 can be communicated to a winding jig 805, as discussed further herein. Cutting tool 1701 is especially well suited for cutting slits 819 having unidirectional fibers such that cutting members 1703 cut the raw material along between adjacent fibers. In contrast, a cutting tool having a male/female press cutting members may be better suited for cutting slits 819 having multidirectional fibers.

Still referring to FIGS. 14-16, the "closed cell" geometry core produced by wrapping broadgood composite material in step 605 of method 601 enables the use of much thinner and lighter composite material, thereby producing a core with very low density. Further, the "closed cell" geometry core can have significantly higher stiffness and strength than is achievable with "open cell" geometry core. Furthermore, "closed cell" geometry core is fully tailorable.

In another embodiment of step 605 of method 601, mandrel 701 is wrapped multiple times to produce multiple layers of composite material layers. In such an embodiment, the fiber orientation, wrap angle, and/or wrapping direction can be varied to produce tailored mechanical and physical properties.

In some situations it may be desirable to provide ventilation and/or drainage in the composite core, such as in a wing member of an aircraft that also functions as a fuel tank. In such an embodiment, step 605 of method 601 can also include creating perforations in the raw material or slit 819. The perforations can be created by any variety of methods;

one method can be running the raw material or slit 819 over a spiked wheel or spiked roller support, for example.

Figure 18:
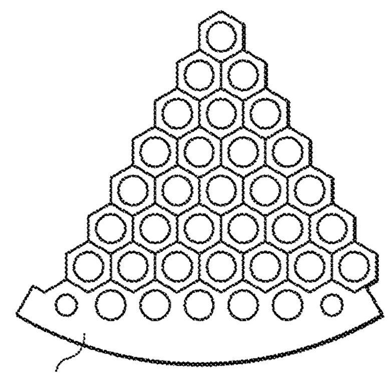
FIG. 18 is a is an end view of a plurality of composite-wrapped mandrels stacked on a partial tool, according to one example embodiment.
Figure 19:
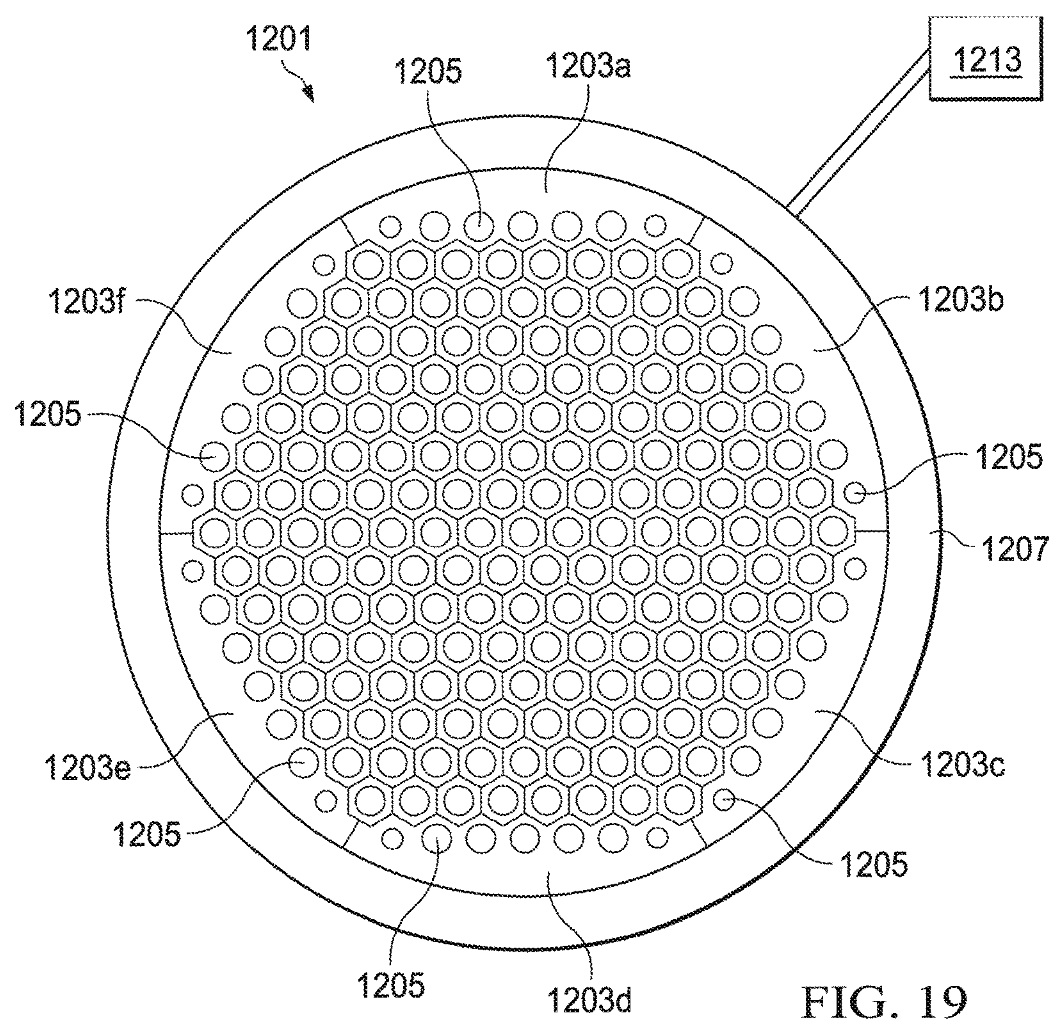
FIG. 19 is an end view of a plurality of composite-wrapped mandrels assembled in a tool, according to one example embodiment.
Figure 20:
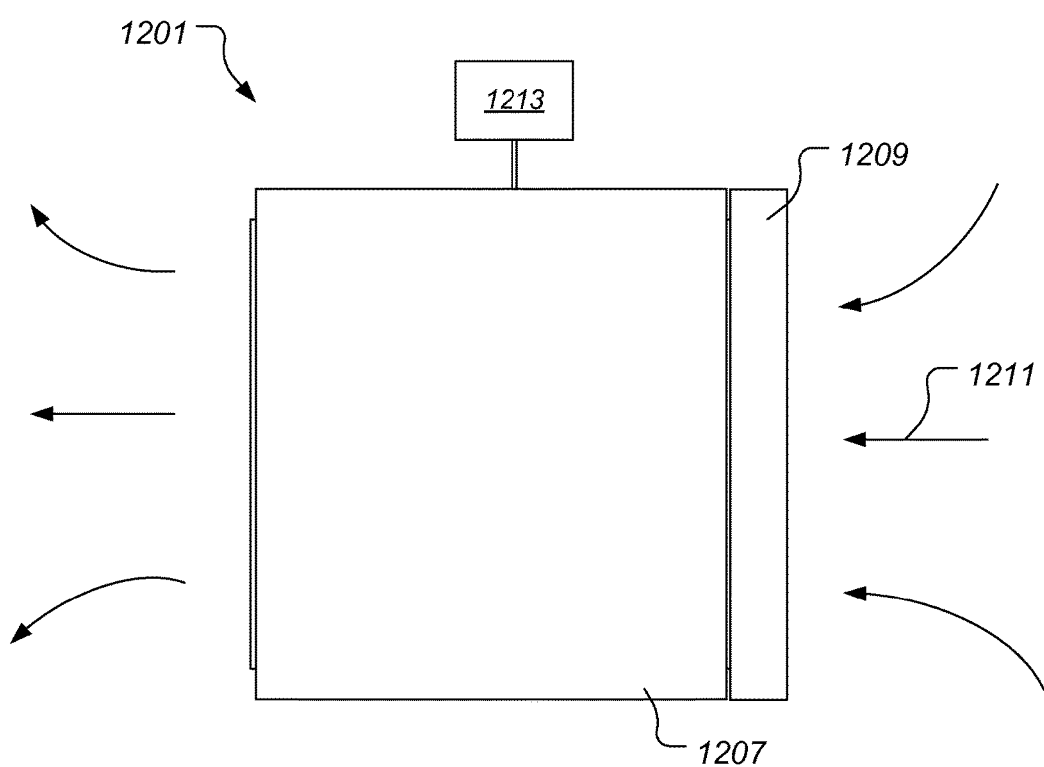
FIG. 20 is a plan view of a plurality of composite-wrapped mandrels assembled in a tool, according to one example embodiment.

Referring again to FIGS. 6 and 7, step 607 of method 601 includes assembling the wrapped mandrels. Step 607 can further include assembling and inserting the wrapped mandrels in a tool or other fixture. The exact configuration of the tool is implementation specific. Referring now also to FIGS. 18-20, an example of a tool 1201 is illustrated. Tool 1201 is configured to produce a hexagonal shaped core member; however, tool 1201 can be configured to provide any desirable shape. For example, alternative shapes of tool 1201 can be configured to produce circular, square, rectangular, or even part customized core shapes. In the illustrated embodiment, the plurality of mandrels 701 having wrapped composite material are assembled onto partial tool members 1203*a*-1203*f* in a pyramid shape. In one embodiment, system 801 is configured to automate the assembly and stacking of wrapped mandrels, as shown in FIG. 7. In another embodiment, the assembly and stacking of wrapped mandrels can be performed manually. Each partial tool member 1203*a*-1203*f* can include apertures 1205 to control and tailor any thermal expansion of the partial tool member 1203*a*-1203*f* during the cure process. In one embodiment, each partial tool member 1203*a*-1203*f* is stacked with seven levels of wrapped mandrels. Upon assembling each partial tool member 1203*a*-1203*f* and their wrapped mandrels, one additional wrapped mandrel is located in the center. However, it should be appreciated that each partial tool member 1203*a*-1203*f* may be stacked with wrapped mandrels and assembled in a variety of ways.

In one example embodiment, tool 1201 includes a bladder 1207 that is configured to inflate to provide a prescribed inward pressure upon the assembly of wrapped mandrels 701. However, it should be appreciated that the present disclosure contemplates other methods of providing pressure to the composite material wrapped around each mandrel 701 during the curing process, such as mechanical pressure generating devices.

In another embodiment, curing pressure can be generated by the thermal expansion of the mandrels 701. In such an embodiment, tool 1201 can include a rigid constraining structure in lieu of bladder 1207. The heating of the mandrels 701 causes thermal expansion, which generates pressure at the composite material between mandrels 701.

Tool 1201 can include a blower 1209 for generating an airflow 1211 and evenly distributing the airflow through the interiors of the plurality of mandrels 701. In an alternative embodiment, a fluid, such as an oil, is circulated through the interiors of the plurality of mandrels 701. Step 609 can include heating the wrapped mandrels within tool 1201 for a prescribed duration in accordance with the cure requirement of the composite system. An oven can be used to generate that requisite heat, for example. Airflow 1211 can improve the heating rate and heat distribution to the composite material wrapped around each mandrel 701, as such; it is particularly desirable to have an interior opening through each mandrel 701 that is sized to accommodate a prescribed amount of airflow. Bladder 1207 can be controlled by a controller 1213 so as to tailor the amount and timing of pressure exerted at the cell walls of composite material between mandrels 701 within tool 1201.

Referring again to FIG. 6, step 609 of method 601 includes curing the composite material wrapped around the mandrels 701 to form the cured composite core 401. As discussed further above, the uncured composite material around each mandrel 701 is cured by subjecting the assembly to the requisite temperature and pressure. As discussed above, the temperature and rate of temperature change of the composite material can be controlled in part by blowing hot air through the interior of mandrels 701. During the curing process of step 609, the temperature and pressure exerted upon the composite material is implementation specific. Bladder 1207 can be controlled by controller 1213 so as to tailor the amount and timing of pressure exerted at the cell walls of composite material between mandrels 701 within tool 1201. For example, bladder 1207 can be controlled by controller 1213 to change the amount of pressure during a viscosity change of the resin in the composite material.

After the cure cycle is complete, a composite core 401 is achieved as the uncured composite material around each mandrel 701 becomes rigidly bonded to each adjacent tube 403. It should be noted that composite core 401 that is formed by wrapping mandrels 701 with unidirectional fiber slits 819 at a prescribed angle produces composite core 401 that has cross-linked fibers at the cell walls. For example, multiple mandrels 701 wrapped at a wrap angle of +45 degrees with slits 819 having unidirectional fibers will produce cured composite core 401 with cell walls having two plies of fibers at 90 degrees to each other. This unique result of the method and system of the present disclosure produces a very lightweight and strong composite core 401.

Still referring to FIG. 6, step 611 of method 601 includes cooling mandrels 701 and removing mandrels 701 from the composite core 401.

The systems and methods disclosed herein include one or more of the following advantages. The method of the present disclosure allows for the efficient production of composite core, which can reduce the cost of the composite core. Further, wrapping mandrels with unidirectional slits provides tailorability of the composite core. Further, the method of curing composite core results in a high quality composite core.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A method of manufacturing a composite core, the method comprising:

wrapping each of a plurality of mandrels with a composite material such that the composite material is wrapped at least 360 degrees around each mandrel;

providing a tool comprising a plurality of partial tools configured to be assembled, each partial tool having an interior surface, an exterior surface, and a plurality of apertures adjacent to the interior surface and disposed between the interior surface and the exterior surface; the plurality of partial tools comprising a first partial tool and a second partial tool;

stacking a first portion of the plurality of mandrels wrapped with the composite material on the interior surface of the first partial tool;

stacking a second portion of the plurality of mandrels wrapped with the composite material on the interior surface of the second partial tool;

assembling the first partial tool and the second partial tool such that some of the plurality of mandrels wrapped with the composite material stacked in the first partial tool are positioned adjacent to some of the plurality of mandrels wrapped with the composite material stacked in the second partial tool; and curing the composite material in a curing process, the curing process including controllably applying an inward pressure to the assembled first partial tool and second partial tool with an inflatable press bladder;

wherein the plurality of apertures provides a control and tailor thermal expansion of the interior surface on the assembled first partial tool and second partial tool during the curing step.

2. The method according to claim 1, wherein the exterior surface of each partial tool is an arc of a tool circumference.

3. The method according to claim 1, wherein the plurality of apertures comprises at least one aperture having a varied circumference from at least one other aperture.

4. The method according to claim 1, wherein the step of wrapping each of the plurality of mandrels with the composite material includes wrapping a slit of the composite material in a helical path on each of the plurality of mandrels starting from an end portion of each of the plurality of mandrels.

5. The method according to claim 1, wherein the steps of stacking a first portion and a second portion of the plurality of mandrels wrapped with the composite material includes stacking the first portion of the plurality of mandrels wrapped with the composite material in a pyramid shape on the first partial tool, stacking the second portion of the plurality of mandrels wrapped with the composite material in a pyramid shape on the second partial tool, then subsequently assembling the first partial tool and the second partial tool.

6. The method according to claim 1, further comprising:

controllably applying a pressure to the tool with a mechanical press during the curing process.

7. The method according to claim 1, wherein each of the plurality of mandrels is hexagonal shaped.

8. The method according to claim 1, wherein the step of curing the composite material includes moving a heated fluid through an interior of at least one of the plurality of mandrels to controllably heat the composite material.

9. A method of manufacturing a block of composite core, the method comprising:

wrapping each of a plurality of mandrels with a composite material such that the composite material is wrapped at least 360 degrees around each mandrel;

providing a tool comprising a plurality of partial tools configured to be assembled into a cylindrical shape, each partial tool having an interior surface, an exterior surface, and a plurality of apertures adjacent to the interior surface and disposed between the interior surface and the exterior surface;

stacking a portion of the plurality of mandrels wrapped with the composite material on the interior surface of each partial tool;

assembling the partial tools to create the assembled tool, wherein some of the plurality of mandrels wrapped with the composite material stacked in each partial tool are positioned adjacent to some of the plurality of mandrels wrapped with the composite material stacked in another partial tool; and controllably applying an inward pressure to the assembled tool with an inflatable press bladder during a curing process;

wherein the plurality of apertures provides a control and tailor thermal expansion of the interior surface on the assembled partial tools during the curing process.

10. The method according to claim 9, further comprising:

moving a heated fluid through an interior of the plurality of mandrels to controllably heat the composite material in the curing process.

11. The method according to claim 10, wherein the heated fluid is a gas.

12. The method according to claim 11, wherein the gas is air.

13. The method according to claim 10, wherein the heated fluid is an oil.

14. The method according to claim 9, wherein the exterior surface of each partial tool is an arc of a tool circumference.

15. The method according to claim 9, wherein the assembled tool comprises six partial tools that are configured to produce a hexagonal shaped core member.

16. The method according to claim 9, wherein the plurality of apertures comprises at least one aperture having a varied circumference from at least one other aperture.

* * * * *